United States Patent

[11] 3,596,725

[72] Inventor Douglas M. Homs
c/o Douglas Homs Corp, 1538 Industrial Way, Belmont, Calif. 94002
[21] Appl. No. 772,489
[22] Filed Nov. 1, 1968
[45] Patented Aug. 3, 1971

[54] HINGED COLUMN FOR SCALE
4 Claims, 3 Drawing Figs.

[52] U.S. Cl............................................. 177/126, 177/246
[51] Int. Cl......................................... G01g 21/00
[50] Field of Search............................ 177/126, 246, 247, 264

[56] References Cited
UNITED STATES PATENTS
| 1,699 | 7/1840 | Dole............... | 177/126 |
| 34,676 | 3/1862 | Fairbanks....... | 177/126 |
| 154,362 | 8/1874 | Wood............. | 177/126 |
| 2,539,570 | 1/1951 | Cousineau...... | 177/126 |

FOREIGN PATENTS
| 3,015 | 1877 | Great Britain.............. | 177/126 |
| 1,126,058 | 11/1956 | France....................... | 177/126 |
| 16,342 | 9/1903 | Sweden...................... | 177/126 |

Primary Examiner—Stephen J. Tomsky
Assistant Examiner—George H. Miller, Jr.
Attorney—Julian Caplan ABSTRACT: A column for scales is provided with a hinge near the base of the column to permit the column to be pivoted inward to rest on the scale platform during shipment, for field use, and storage. The steelyard is connected to the long lever nose iron by a chain or other flexible connection to facilitate pivotting. The hinge is duplicated on opposite sides of the column so that the column and beam may be rotated 180° to make the beam readable from the front or reverse sides of the scale by an easily performed reversal operation. A handle for tilting to facilitate moving the scale on its two wheels and snubbers protecting the column and platform in horizontal position are likewise reversible.

Patented Aug. 3, 1971
3,596,725
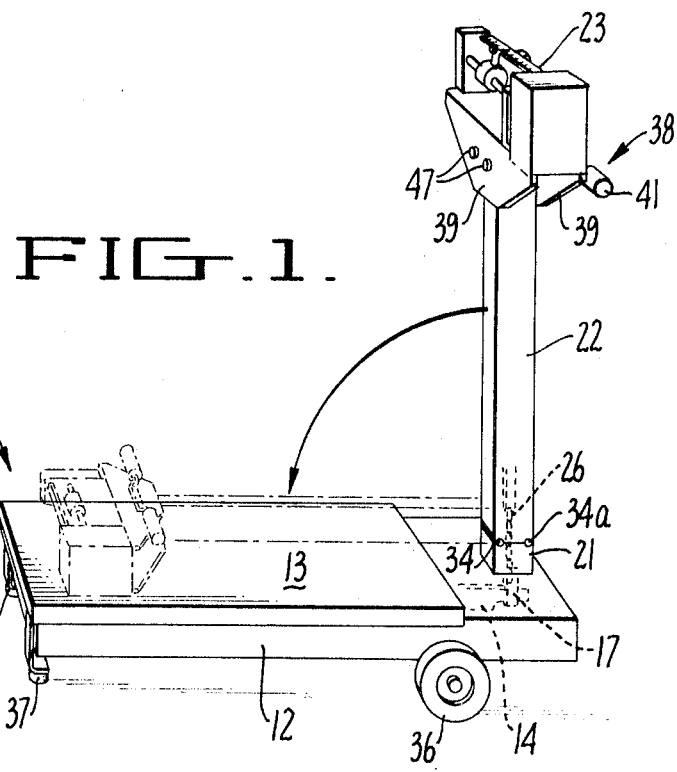
FIG.1.
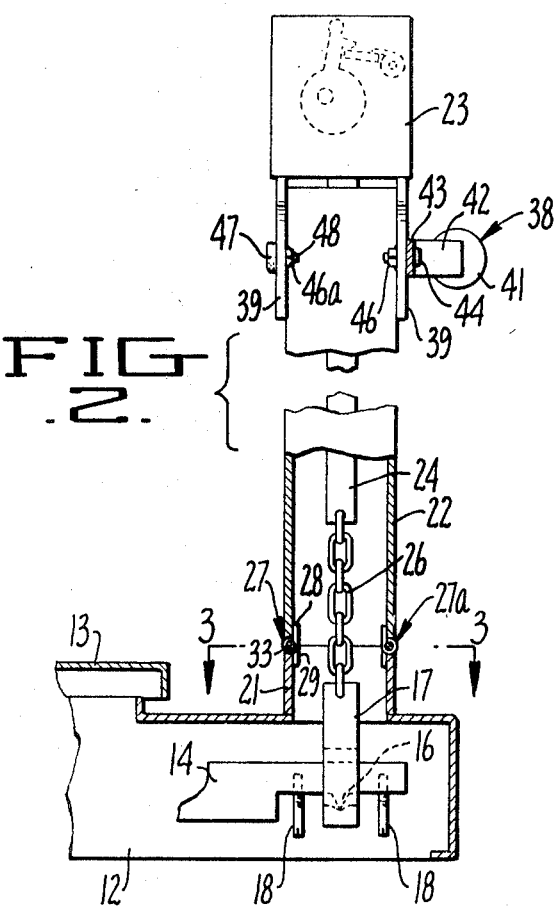
FIG.2.
FIG.3.
INVENTOR.
DOUGLAS M. HOMS
BY
Julian Caplan
ATTORNEY

HINGED COLUMN FOR SCALE

This invention relates to a new and improved hinged column for scales. More particularly, the invention relates to the provision of a hinge near the base of the column of a scale enabling the column to be pivoted down to rest on top of the platform for shipment, for field use, and storage.

A principal feature and advantage of the invention is the fact that the column may be pivoted to horizontal position for shipment, and upon arrival at destination may be raised to an upright position and fixed in place by untrained personnel and without the use of special tools. Additionally, in many instances it is desirable to store or transport the scale in folded position, and the reverse operations required to fold the column may be performed without special skill or tools.

Another feature of the invention is the fact that by duplicating the hinge construction on opposite sides of the column, the column may be reversed with ease. In certain installations it is desirable that the beam be read from the platform side of the scale while in other instances it is desirable that the beam be read from the back. By simple adjustments of the mechanism, the column may be turned 180° so that the beam may be read from opposite sides. The construction which enables the column to be reversed is the provision of separate but interchangeable hinge leaves and hinge pins. When the column is to be pivoted, the hinge pin on the side opposite the platform is removed, enabling the column to be pivoted down about the axis of the pin on the platform side so that it is horizontal. When the column is erected, the removed pin is reinstalled and retains the column in place. As hereinafter described in detail, the provision of duplicate hinge leaf and pin constructions makes it possible to reverse the direction of the column with facility.

Other objects of the present invention will become apparent upon reading the following specification and referring to the accompanying drawings in which similar characters of reference represent corresponding parts in each of the several views.

In the drawings:

FIG. 1 is a perspective view of a platform scale in accordance with the present invention showing the column in vertical position in solid lines and horizontal in dot-and-dash lines.

FIG. 2 is an enlarged side elevational view, partly broken away in section, showing the column and a portion of the platform construction.

FIG. 3 is an enlarged sectional view taken substantially along the line 3—3 of FIG. 2.

The scale 11 illustrated herein is of conventional construction in many of its parts and also is subject to considerable variation from the form illustrated and hereinafter described. Thus, it will be understood that the present invention is adaptable to a variety of different scale constructions. In the form here shown, a skirted base 12 is provided above which platform 13 is suspended. A system of levers is installed within the base 12 as is well understood in this art and is not herein illustrated. The last of these levers is the so-called "long" lever 14. At the rearward end of lever 14 is a fulcrum 16 which is engaged by nose iron 17. Threaded pins 18 forward and rearward of nose iron 17 are threaded into lever 14 to prevent disengagement of member 17. An opening surrounded by a square flange 21 is disposed upon the top of base 12 immediately above the nose iron 17. Resting on flange 21 is a hollow column 22 and upon the top of the column is beam 23 and the various poises, well understood in the art. Reciprocating vertically inside column 22 is steelyard 24. The connection between steelyard 24 and member 17 is flexible in order to permit folding of column 22. As herein illustrated, a preferred connection is chain 26.

An important feature of the present invention is the provision of means to permit folding of column 22 from the vertical position shown in solid lines in FIG. 1 to the horizontal dot-and-dash position wherein it rests upon platform 13. For such purpose, front and rear hinge connections 27, 27a are provided. Each of the hinges is of the leaf type having a transverse horizontal pivot axis. Leaf 28 of hinge 27 is thus welded or otherwise secured to the bottom edge of the front of column 22, whereas leaf 29 is secured to the corresponding edge of flange 21. The interfitting loops 31, 32 of leaves 28 and 29, respectively, receive hinge pin 33. Preferably one end of pin 33 is screwed into the internally threaded loop 32b on the opposite end. To facilitate access for installation and removal of pin 33, holes 34 are formed in opposite sides of the interface of flange 21 and column 22. Thus, by inserting the pin 33 through one of the openings 34 and through the loops 31, 32, the end may be screwed into the loop 32b. The structure of hinge 27 is repeated in hinge 27a and the same reference numerals followed by the subscript a are used to designate corresponding parts. The loop 32c corresponds in construction to the loop 32b.

When it is desired to fold column 22 from the vertical solid line position of FIG. 1 to the horizontal dot-and-dash position, the rear pin 33a is removed, thereby permitting the hinge 27a to separate. The column is then folded downward about the hinge pin 33. It will be understood that this is the position for shipment, field use, and, optionally, for storage. When it is desired to raise the column 22 to vertical position, it is pivoted upward until the leaves 31a, 32a interfit, whereupon the pin 33a is inserted through one of the holes 34a and screwed into the loop 32c.

FIG. 1 illustrates one of the normal positions of beam 23 whereby the beam may best be read from the back side of the scale. However, it is sometimes desirable that the scale be read from the platform-facing side. The construction heretofore described makes such reversal of the beam 23 feasible. To perform the reversal operation, the outer pin 18 is removed and the nose iron 17 slipped over the rear end of lever 14. Pins 33 and 33a are both removed, permitting the column to be lifted off flange 21 and rotated 180°. Since the hinges 27, 27a are interchangeable, the parts may be reassembled in reverse order with the beam facing in the opposite direction.

The scale shown in FIG. 1 is portable, it being understood that this is an optional feature of the construction. For such purpose, wheels 36 are attached to base 12 adjacent to the rear of said base, preferably just forward of the column 22. At the opposite end, legs 37 extend down from base 12 and are of the proper height so that the platform 13 is level. A handle 38 is fixed to the back of column 22. Preferably there are transverse plates 39 on both the front and rear of column 22 to one of which handle 38 is attached. Thus, handle 38 may consist of a transverse horizontal bar 41 having brackets 42 spacing the bar 41 from plates 39, the inner ends of brackets 42 having feet 43. Bolts 44 extend through suitable apertures in feet 43 and plate 39 and are threaded into nut 46 fixed to the inside of plate 39. When, as has been explained, column 22 is reversed in position, it is desirable that the handle 38 likewise be reversed. Thus, the apertures in both plates 39 are spaced the same distance and the bolt 44 engages either the nut 46 or 46a depending upon the location of the handle.

To reduce the shock of the column 22 engaging the platform 13 in folded position, snubbers 47 may be positioned on the forward face of the column 22. Snubbers 47 have threaded studs 48 which fit into the apertures in plate 39 and are held in place by nut 46 or 46a. The snubbers are likewise reversed in position when the handle 38 is reversed.

What I claim is:

1. A hinged-column scale having a base, having a first end and a second end, a hollow flange mounted on said first end of said base, a hollow column above said flange, hinge means interconnecting the lower end of said column and said base to permit pivoting of said column toward said second end to overlie said platform, said hinge means partially on said flange and partially on said column, cooperating detachable securing means on said flange and said column for holding said column in erect position relative to said base, a platform suspended above said base and below the level of said hinge means, a lever system in said base tilted by a load deposited on said platform, said lever system having a lever extending to said first end, a beam supported on said column for balancing and measuring said load, a steelyard in said column connected to said beam system, and a flexible connector between said level and said steelyard, and said connector received in said flange.

2. A scale according to claim 1 in which said securing means comprises a second hinge means partially on said flange and partially on said column and having a removable hinge pin.

3. A scale according to claim 2 in which said first-mentioned hinge means also has a removable hinge pin, said first-mentioned and second hinge means having interchangeable parts, whereby said column may be reversed in position with said beam system facing said second end or away from said second end.

4. A scale according to claim 3 in which said flexible connection is detachable from said lever to permit reversal of said column.